SUPERCONDUCTIVE CABLE CONSTRUCTION

Filed Jan. 5, 1968

United States Patent Office 3,474,187

Patented Oct. 21, 1969

3,474,187

SUPERCONDUCTIVE CABLE CONSTRUCTION

Lucien Donadieu, Svres, Jean Royet, Orsay, and Jacques Maldy, Wissous, France, assignors to Compagnie Generale d'Electricite, Paris, France, a French corporation Filed Jan. 5, 1968, Ser. No. 695,961
Claims priority, application France, Jan. 6, 1967, 90,323
Int. Cl. H01b *5/08*
U.S. Cl. 174—128 7 Claims

ABSTRACT OF THE DISCLOSURE

A superconductive conductor in the form of a plurality of strands made up of superconductive wires and wires of normal conductivity having high mechanical strength wound about a conductive core. The strands being imbedded in a solid sheath of metal possessing high electrical conductivity of cryogenic temperatures.

The present invention relates to a superconductive conductor of great mechanical strength.

It is known that superconductive conductors may be formed by combining a superconductive substance such as lead, a columbium-tin compound, or a columbium-zirconium alloy, with a metal which is not superconductive, but possesses high electrical conductivity at the temperature in question. This metal may be gold, silver, copper or aluminum. The combination of the metal possessing normal conductivity and the superconductive substance renders it possible to overcome the harmful effects resulting in particular from sudden changes in flux in the conductor, which result in local cancelling of the superconductive condition and in engendering a so-called thermic wave which is propagated in the conductor and thus causes the entire conductor to revert to the normal conductive condition.

In a known form of construction of superconductive conductors of this kind, wires or strips of superconductive material are at least partially situated within a mass of metal possessing high electrical conductivity, the said wires or strips being in intimate contact with the said metal. Conductors so stabilized are employed to carry very high current intensities and consequently are the locus of great electromagnetic forces. The mechanical strength of conductors stabilized in such manner has not been adequate until now to ensure satisfactory behavior of the conductor, which must be held and secured by means of ancillary devices.

In a superconductive coil, the stresses of electromagnetic origin are accompanied by stresses engendered by contractions or expansions occurring in the cable during application of coolant or during its return to ambient temperature. In view of these stresses, the said conductors require mechanical protection, which entails complications in their application, specifically in coils of great size.

It is an object of the present invention to provide a superconductive conductor which substantially avoids all of the difficulties inherent in known constructions of a similar nature.

It is an object of the present invention to provide a superconductive conductor which is capable of combining stability with great mechanical strength.

It is another object of the present invention to provide a superconductive conductor which is moreover capable of being wound without requiring any, or at least very little, support provided by extraneous means.

It is a further object of the present invention to provide a superconductive conductor which is able to withstand great electromagnetic stresses.

It is still another object of the present invention to provide a stabilized superconductive conductor which is capable of withstanding thermal strains in its application in the form of a coil.

The invention relates to a stabilized superconductive conductor comprising a plurality of superconductive elements interconnected by means of a sheath of metal possessing high electrical conductivity at the temperature of superconductivity of the said elements, the said sheath at least partly covering the said elements and being in satisfactory electrical and thermal contact with the same, and according to a feature of the invention, the said elements consisting of strands comprising at least one superconductive wire and one wire of material of adequate mechanical strength.

In a preferred embodiment of the invention, each of the said strands comprises at least one superconductive wire and at least one wire of adequate mechanical strength, the strands being covered entirely by the said metal sheath. The metal possessing adequate mechanical strength may advantageously be chosen from the group of metals including steel, stainless steel, non-magnetic stainless steel, and iron. The metal possessing high electrical conductivity may be chosen from the group of metals including aluminum, copper, silver, beryllium or zirconium.

The invention will now be described with reference to the accompanying drawings, which illustrates the invention, but in no restrictive sense.

Figure 1:
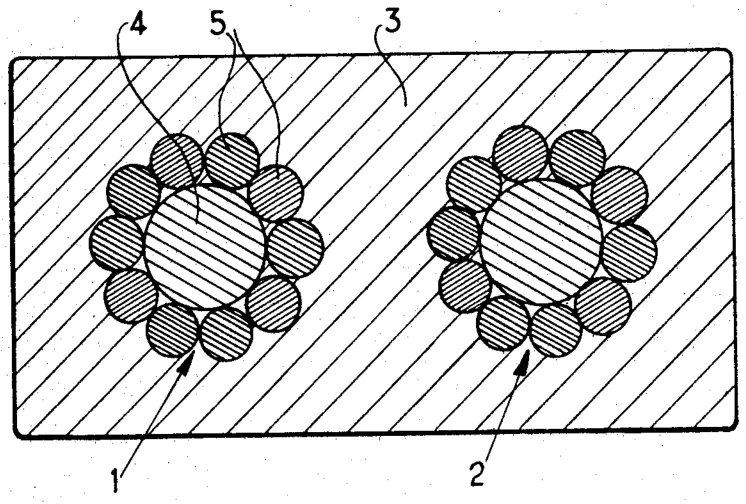
FIGURE 1 illustrates the cross-section of a strip-shaped conductor in accordance with the present invention, which is rated to carry a current intensity of the order of 1000 amperes.

In FIGURE 1, the conductor comprises two strands 1 and 2 encased, for example, in a sheath 3 of high purity aluminum, the strands being in satisfactory electrical and thermal contact with the said sheath. In accordance with the invention the sheath 3 may also be made of other metals of high electrical conductivity, such as copper, silver, beryllium and zirconium.

Each strand comprises a core 4 of stainless steel, of a diameter of approximately 0.75 mm. (30 thousandths of an inch), and ten superconductive wires 5, for example, of columbium-zirconium, which may be copper-plated either by a metallurgical process or by electrolysis, or coated with another metal such as lead or indium, each superconductive wire having a diameter of approximately 0.33 mm. (0.0133").

The superconductive conductor may advantageously be produced by conjoint extrusion of the sheath around the strands. The size of the said sheath amounts to approximately 3 x 5 mm. (0.12 x 0.2 inch) in cross-section. A conductor of this nature is capable of carrying a current intensity of the order of 1,000 amperes in a stabilized manner. The said steel core may, according to another feature, consist of a steel cable of the same diameter.

A conductor of this nature offers a variety of advantages: First of all, stabilization occurs without exception even if cooling is applied by contact of a cryogenic fluid on one section only of the conductor. In addition, the mean current carrying density is high, being close to 67 amps/mm.$^2$, and the mechanical strength is very great owing to the presence of the stainless steel wires. The strip may in fact bear tensile stresses reaching approximately 200 kg. (440 lbs.). The structure of the conductor is simple, and the use of very strong strands facilitates production by conjoint extrusion of aluminum. Great flexibility in application is achieved thereby, since it is possible as a rule for a conductor possessing the required mechanical strength and the required degree of stabilization, that is to say, the ratio between the cross-section of normal material and the cross-section of the superconductive material, to be produced easily by selection in an appropriate manner within the capabilities of one versed in the art the number and diameter of the wires of superconductive material and of the wires of material possessing great mechanical strength.

Figure 2:
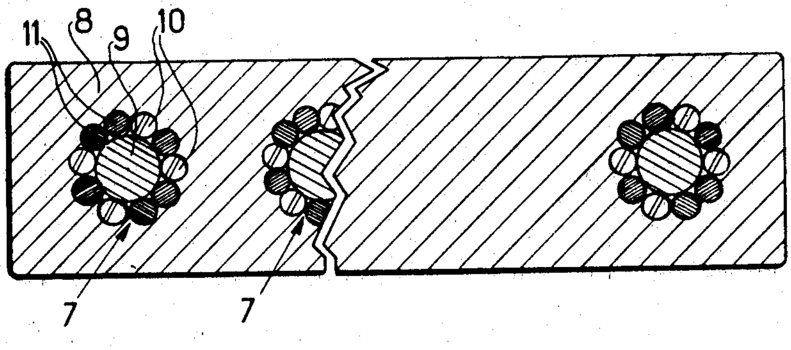
FIGURE 2 illustrates the cross-section of another strip-shaped conductor in accordance with the present invention, which is rated to carry a current intensity of the order of 10,000 amperes.

FIGURE 2 illustrates the cross-section of another embodiment of a superconductive conductor according to the invention. This conductor, which is rated to carry a current intensity of the order of 10,000 amperes, comprises twenty-five strands 7 which are distributed uniformly and with satisfactory electrical and thermal contact within a sheath 8 of rectangular cross-section measuring approximately 75 x 3 mm. (3" x 0.12"). Each strand comprises for example a central core 9 of stainless steel having a diameter of approximately 0.75 mm. (0.03"), four stainless steel wires 10 of a diameter of approximately 0.33 mm. (0.0133"), and six wires 11 of the same diameter, of columbium-titanium. The purity of the aluminum employed for the sheath amounts to 99.995%.

Copper, silver, beryllium or zirconium may be employed instead of aluminum for the sheath 8. Analogously, any other material of adequate mechanical strength may be employed instead of stainless steel.

We have shown and described two embodiments in accordance with the present invention. It is understood that the same is not limited thereto but is susceptible of numerous changes and modifications as known to a person skilled in the art and we, therefore, do not wish to be limited to the details shown and described herein, but intend to cover all such changes and modifications as are encompassed by the scope of the appended claims.

We claim:

1. A superconductive conductor of high mechanical strength comprising a plurality of superconductive elements at least partially embedded in a solid sheath made of a metal having high electrical conductivity at the temperature of superconductivity of the said elements and being in electrical and thermal contact with said elements.

said superconductive elements each being provided in the form of a strand formed of at least one wire made of a superconductive material and at least one wire made of a material having normal conductivity at low temperatures and possessing relatively greater mechanical strength than said superconductive wire, said wires being wound together in at least one layer on a core of relatively larger diameter than said wires.

2. A superconductive conductor of high mechanical strength comprising a plurality of superconductive elements each being provided in the form of a strand comprising at least one superconductive wire made of a metal selected from a group consisting of lead, a columbium-tin compound, a columbium-zirconium alloy and a columbium-titanium alloy, and at least one wire made of a material of high mechanical strength selected from the group of metals consisting of steel, stainless steel, nonmagnetic stainless steel and iron, said superconductive elements being embedded in a solid sheath made of a metal possessing high electrical conductivity selected from the group consisting of aluminum, copper, silver, beryllium and zirconium.

3. A superconductive conductor as defined in claim 2 wherein said superconductive wires are coated with a metal selected from the group consisting of copper, lead and indium.

4. A superconductive conductor as defined in claim 2 wherein each strand comprises a core of relatively larger diameter than the said wires which are wound thereabout, said core being made of a metal possessing high mechanical strength.

5. A superconductive conductor as defined in claim 4 wherein all of said wires have a diameter of approximately 0.0133 inch.

6. A superconductive conductor as defined in claim 5 wherein said sheath is made of high purity aluminum and has a size of approximately 0.12 by 0.2 inch in cross-section.

7. A superconductive conductor as defined in claim 2 wherein at least twenty-five superconductive elements are embedded in said sheath.

References Cited

UNITED STATES PATENTS

| | | | |
|---|---|---|---|
| 2,132,235 | 10/1938 | Green | 174—128 |
| 2,778,870 | 1/1957 | Nolan | 174—128 |
| 3,372,470 | 3/1968 | Bindari. | |
| 3,332,047 | 7/1967 | Borchert. | |
| 3.345.456 | 10/1967 | Gilmore | 174—128 |

FOREIGN PATENTS

| | | | |
|---|---|---|---|
| 1,096,535 | 12/1967 | Great Britain. | |

E. A. GOLDBERG, Primary Examiner

U.S. Cl. X.R.

174—15